(12) United States Patent
Foti

(10) Patent No.: US 12,425,457 B2
(45) Date of Patent: Sep. 23, 2025

(54) INTERNET PROTOCOL MULTIMEDIA SUBSYSTEM SUPPORT FOR STAND-ALONE NON-PUBLIC NETWORKS

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 538 days.

(21) Appl. No.: 17/796,907

(22) PCT Filed: Feb. 9, 2021

(86) PCT No.: PCT/IB2021/051036
§ 371 (c)(1),
(2) Date: Aug. 2, 2022

(87) PCT Pub. No.: WO2021/161167
PCT Pub. Date: Aug. 19, 2021

(65) Prior Publication Data
US 2023/0058147 A1 Feb. 23, 2023

Related U.S. Application Data

(60) Provisional application No. 62/975,918, filed on Feb. 13, 2020.

(51) Int. Cl.
*H04W 8/08* (2009.01)
*H04L 65/1016* (2022.01)
(Continued)

(52) U.S. Cl.
CPC ...... *H04L 65/1073* (2013.01); *H04L 65/1016* (2013.01); *H04L 65/1045* (2022.05)

(58) Field of Classification Search
CPC ............ H04L 65/1073; H04L 65/1016; H04L 65/1045; H04W 36/14
(Continued)

(56) References Cited

PUBLICATIONS

NTT DOCOMO; Key Issue: Determination of VPLMN-ID at IMS entities in HPLMN, SA WG2 Meeting #110 S2-152384 Jul. 6-10, 2015, Dubrovnik, Croatia (Year: 2015).*
(Continued)

*Primary Examiner* — Tanmay K Shah
(74) *Attorney, Agent, or Firm* — Weisberg I.P. Law, P.A.

(57) ABSTRACT

Apparatuses and methods for IMS support for standalone non-public networks (SNPNs) are disclosed. In one embodiment, a method implemented in a policy node includes sending a Public Land Mobile Network, PLMN, identifier, ID, and a network identifier, NID, a combination of the PLMN ID and the NID identifying a standalone non-public network, SNPN being associated with a user equipment, UE. In one embodiment, a method implemented in an application function, AF, node includes receiving an Internet Protocol, IP, Multimedia Subsystem, IMS, registration request from a user equipment, UE; and as a result of receiving the IMS registration request, subscribing to be notified of a Public Land Mobile Network, PLMN, identifier, ID, and a network identifier, NID, a combination of the PLMN ID and the NID identifying a standalone non-public network, SNPN, associated with the UE.

11 Claims, 7 Drawing Sheets

(51) Int. Cl.
*H04L 65/1045* (2022.01)
*H04L 65/1073* (2022.01)

(58) Field of Classification Search
USPC ........................................................ 455/435.1
See application file for complete search history.

(56) References Cited

PUBLICATIONS

3GPP TSG-SA2 Meeting #131 S2-1902808 Santa Cruz—Tenerife, Spain, Feb. 25, 2019-Mar. 1, 2019 (Year: 2019).*
International Search Report and Written Opinion dated May 7, 2021 for International Application No. PCT/IB2021/051036 filed Feb. 9, 2021; consisting of 10 pages.
3GPP TR 23.700-07 V0.3.0; 3rd Generation Partnership Project; Technical Specification Group Services and System Aspects; Study on enhanced support of non-public networks (Release 17); Jan. 2020; consisting of 42 pages.
3GPP TS 29.514 V16.5.0; 3rd Generation Partnership Project; Technical Specification Group Core Network and Terminals; 5G System; Policy Authorization Service; Stage 3 (Release 16); Jun. 2020; consisting of 166 pages.
3GPP TSG-CT WG3 Meeting #110e C3-203303; Title: Providing NID to the P-CSCF; Source to WG: Ericsson; Source to TSG: C3; Work item code: Vertical_LAN; Date and Location: Jun. 2-11, 2020, E-Meeting; consisting of 2 pages.
SA WG2 Meeting #110 S2-152384; Title: Key Issue: Determination of VPLMN-ID at IMS entities in HPLMN; Source: NTT DOCOMO; Document for. Approval; Agenda Item: 6.13; Work Item/Release: FA_V8/Rel-14; Date and Location: Jul. 6-10, 2015, Dubrovnik, Croatia; consisting of 3 pages.
3GPP TSG-SA2 Meeting #131 S2-1902808; Title: TS 23.501:Introducing Non-public network; Source to WG: Qualcomm Incorporated, Ericsson, Nokia, Nokia Shanghai Bell, NICT, Intel; Work Item code: Vertical_LAN; Date and Location: Feb. 25-Mar. 1, 2019, Santa Cruz-Tenerife, Spain; consisting of 11 pages.

* cited by examiner

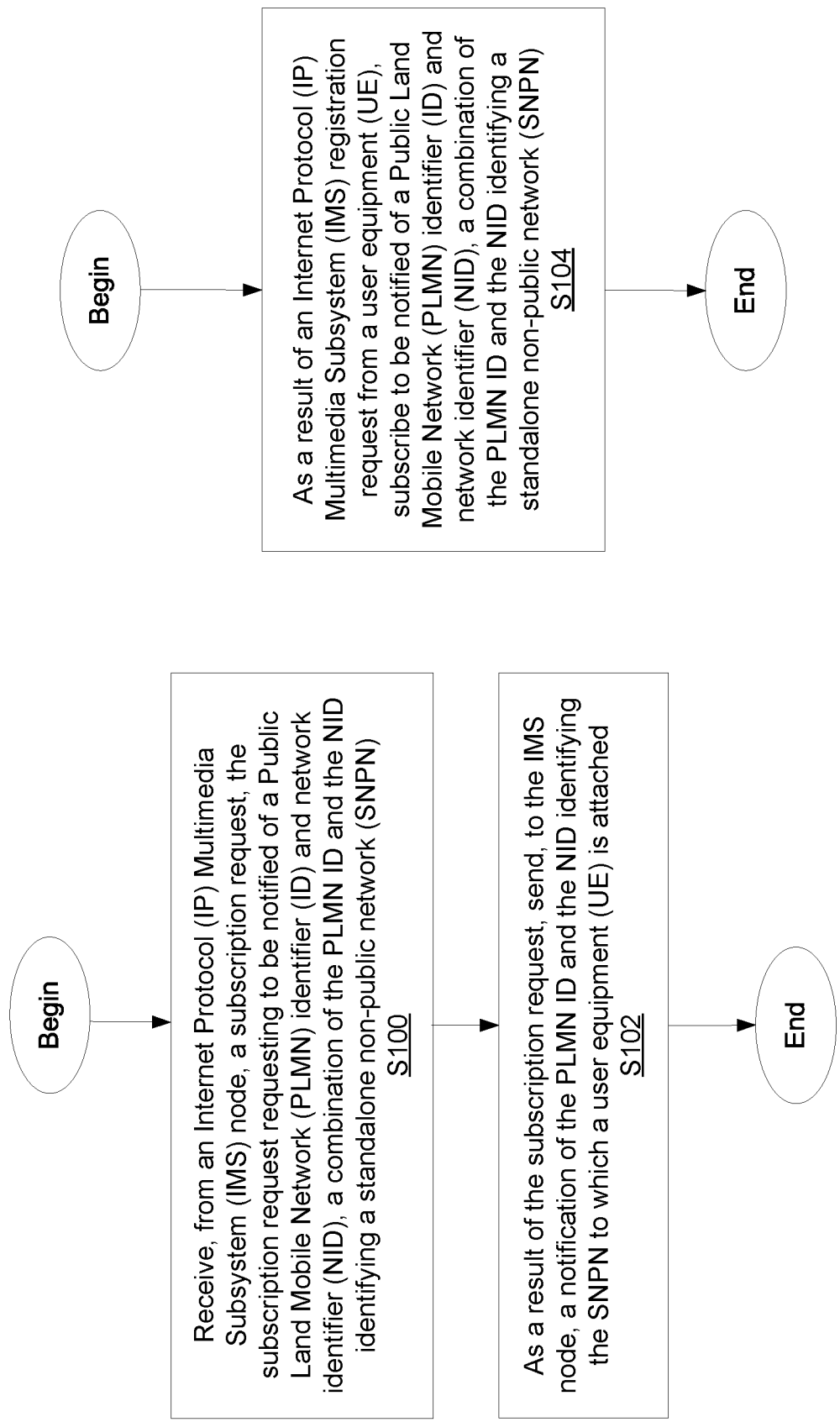

INTERNET PROTOCOL MULTIMEDIA SUBSYSTEM SUPPORT FOR STAND-ALONE NON-PUBLIC NETWORKS

CROSS-REFERENCE TO RELATED APPLICATIONS

This application is a Submission Under 35 U.S.C. § 371 for U.S. National Stage Patent Application of International Application No.: PCT/IB2021/051036, filed Feb. 9, 2021 entitled "INTERNET PROTOCOL MULTIMEDIA SUBSYSTEM SUPPORT FOR STAND-ALONE NON-PUBLIC NETWORKS," which claims priority to U.S. Provisional Application No. 62/975,918, filed Feb. 13, 2020, entitled "IMS SUPPORT FOR STAND-ALONE NON-PUBLIC NETWORK (SNPN)," the entireties of both of which are incorporated herein by reference.

TECHNICAL FIELD

The present disclosure relates to wireless communication and, in particular, to methods and apparatuses for Internet Protocol (IP) Multimedia Subsystem (IMS) support for stand-alone non-public networks (SNPN).

BACKGROUND

The IP Multimedia Subsystem (hereinafter IMS) enables operators of a Public Land Mobile Network (hereinafter PLMN) to provide their subscribers with multimedia services based and built on Internet applications, services and protocols. Different services and applications can be offered on top of IMS. Stand-alone non-public networks (SNPNs) using IMS may be widely deployed but ways to enable users/subscribers in SNPNs to be able to fully utilize IMS services are not developed.

SUMMARY

Some embodiments advantageously provide methods and apparatuses related to IMS support for SNPNs.

In one embodiment, a method implemented in a policy node includes receiving, from an Internet Protocol (IP) Multimedia Subsystem (IMS) node, a subscription request, the subscription request requesting to be notified of a Public Land Mobile Network (PLMN) identifier (ID) and network identifier (NID), a combination of the PLMN ID and the NID identifying a standalone non-public network (SNPN); and as a result of the subscription request, sending, to the IMS node, a notification of the PLMN ID and the NID identifying the SNPN to which a user equipment (UE) is attached.

In one embodiment, a method implemented in a proxy-call session control function (P-CSCF) node includes, as a result of an IMS registration request from a UE, subscribing to be notified of a PLMN ID and NID, a combination of the PLMN ID and the NID identifying a SNPN.

In one embodiment, a method implemented in a network node includes sending a PLMN ID and NID to an IMS node, a combination of the PLMN ID and the NID identifying SNPN.

According to some aspects of the present disclosure, a method implemented in a policy node is provided. The method includes sending a Public Land Mobile Network, PLMN, identifier, ID, and a network identifier, NID, a combination of the PLMN ID and the NID identifying a standalone non-public network, SNPN being associated with a user equipment, UE.

In some embodiments of this aspect, the method further includes receiving a subscription request, the subscription request requesting to be notified of the PLMN ID and the NID; and sending the PLMN ID and the NID further comprises sending a notification comprising the PLMN ID and the NID as a result of the received subscription request. In some embodiments of this aspect, at least one of: sending the PLMN ID and the NID comprises sending the PLMN ID and the NID to an application function (AF) node; receiving the subscription request comprises receiving the subscription request from the AF node; and the AF node is at least one of an Internet Protocol, IP, Multimedia Subsystem, IMS, node and a proxy-call session control function, P-CSCF, node.

In some embodiments of this aspect, sending the PLMN ID and the NID and/or receiving the subscription request corresponds to a PLMN change event to report the combination of the PLMN ID and the NID identifying the SNPN associated with the UE. In some embodiments of this aspect, the combination of the PLMN ID and the NID is used for at least one of charging and statistical data collection for the UE. In some embodiments of this aspect, sending the PLMN ID and the NID further comprises sending a notification comprising the PLMN ID and the NID as a result of a handover of the UE from a first PLMN to a second PLMN. In some embodiments of this aspect, the PLMN ID comprised in the notification identifies the second PLMN; and the NID comprised in the notification identifies the SNPN out of a plurality of SNPNs associated with the second PLMN.

According to another aspect of the present disclosure, a method implemented in an application function, AF, node is provided. The method includes receiving an Internet Protocol, IP, Multimedia Subsystem, IMS, registration request from a user equipment, UE. The method includes as a result of receiving the IMS registration request, subscribing to be notified of a Public Land Mobile Network, PLMN, identifier, ID, and a network identifier, NID, a combination of the PLMN ID and the NID identifying a standalone non-public network, SNPN, associated with the UE.

In some embodiments of this aspect, the method further includes at least one of: as a result of the subscription, receiving a notification including the PLMN ID and the NID identifying the SNPN associated with the UE; and sending the received PLMN ID and the NID to a second AF node. In some embodiments of this aspect, the method further includes including the received PLMN ID and the NID in a SIP message. In some embodiments of this aspect, the SIP message is a SIP register request message. In some embodiments of this aspect, the method further includes forwarding the SIP message comprising the PLMN ID and the NID to a second AF node. In some embodiments, the AF node comprises at least one of an IMS node and a proxy-call session control function, P-CSCF, node.

According to yet another aspect of the present disclosure, a method implemented in an application function, AF, node is provided. The method includes receiving a Public Land Mobile Network, PLMN, identifier, ID, and a network identifier, NID, a combination of the PLMN ID and the NID identifying a standalone non-public network, SNPN, associated with a user equipment, UE. The method includes sending the received PLMN ID and the NID to a second application function, AF, node.

In some embodiments of this aspect, the method further includes subscribing to be notified of the PLMN ID and the NID associated with the UE. In some embodiments of this aspect, receiving the PLMN ID and the NID further comprising receiving the PLMN ID and the NID identifying the SNPN associated with the UE as a result of the subscription. In some embodiments of this aspect, the AF node comprises at least one of an IMS node, an IMS application server, AS, and a serving-call session control function, S-CSCF, node.

According to another aspect of the present disclosure, a system comprising computer program instructions executable by processing circuitry and/or at least one processor to implement any one or more of the methods above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart of an exemplary process in a policy node according to some embodiments of the present disclosure;

FIG. 4 is a flowchart of an exemplary process in an AF node, such as a proxy-call session control function (P-CSCF) node according to some embodiments of the present disclosure;

DETAILED DESCRIPTION

Figure 1:
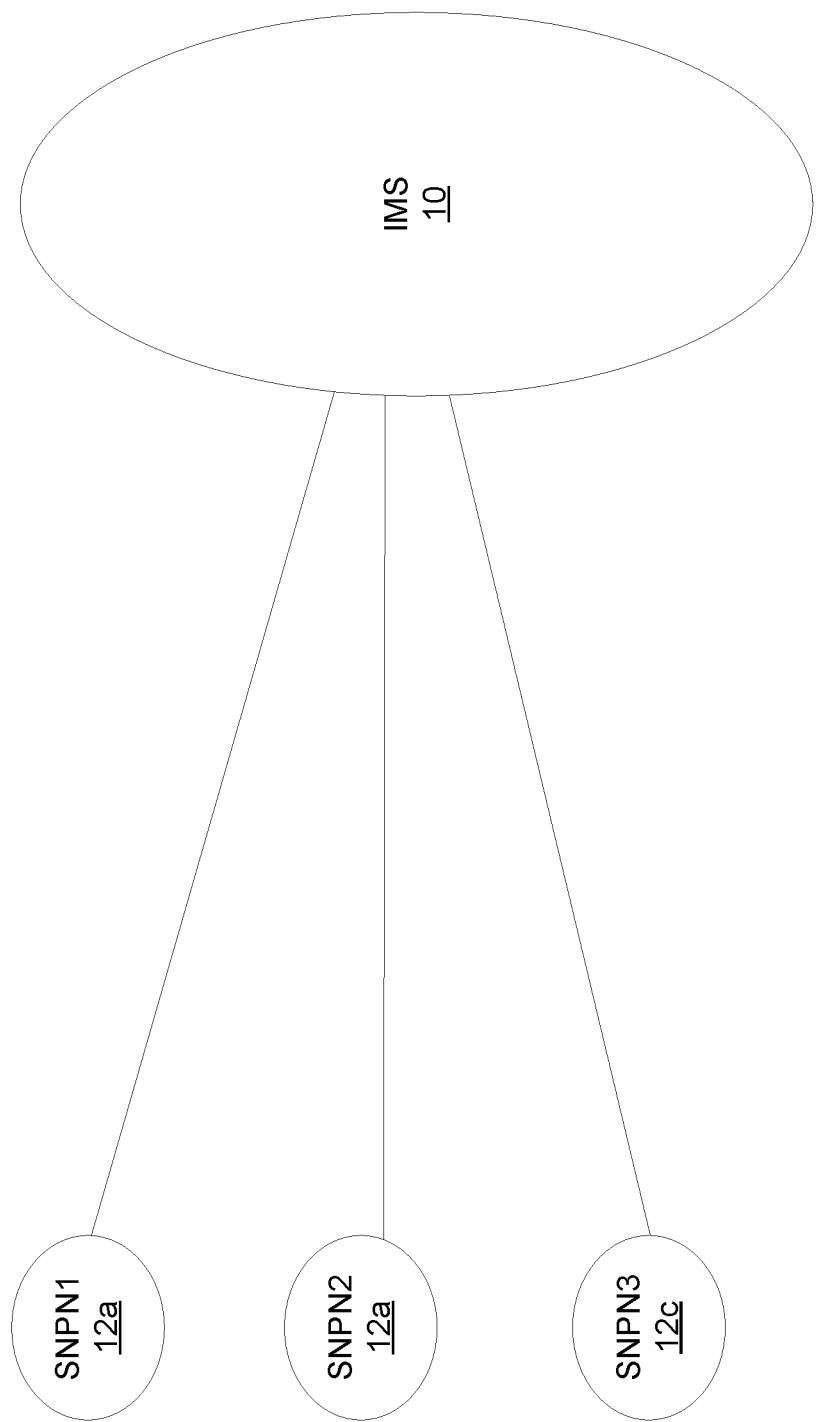
FIG. 1 illustrates an example conceptual arrangement of an IMS network and multiple NPNs.

In some scenarios, a single IMS network 10 may support multiple SNPNs 12a-c (collectively, SNPNs 12), as shown, for example, in FIG. 1. The multiple SNPNs 12 may share the same PLMN identifier (ID). Thus, the IMS network 10 may not be able to charge the different SNPNs 12 accordingly; nor will IMS 10 be able to statistically distinguish data collected from the multiple SNPNs 12. This applies both to Local Breakout (LBO) and deployments without IMS level roaming agreements.

Some embodiments of the present disclosure provide arrangements for IMS (e.g., one or more IMS nodes) to acquire a network identifier (NID) in addition to the PLMN ID for each SNPN. Some embodiments of the present disclosure provide arrangement for IMS (e.g., one or more IMS nodes) to be able to include this information (e.g., PLMN ID and NID for each SNPN) in charging related information, as well as, collected statistical information.

Some embodiments of the present disclosure may be configured to support one or more of the following uses cases:

Handover (both ways) between an SNPN and a public PLMN with whom the user equipment (UE) has subscription, in addition to the SNPN.

Handover between multiple SNPNs that may share the same or different PLMNs.

Some embodiments of the present disclosure may provide for a current PLMN change event to be extended to support reporting the network identifier (NID), where applicable in addition to the PLMN ID.

In some embodiments, at initial IMS registration, a P-CSCF node subscribes to a policy node (e.g., PCRF/PCF) to be notified of the PLMN ID and NID where the UE is currently attached. The PLMN ID and the NID may together identify a single SNPN. When the P-CSCF node receives the notification of the PLMN ID and NID identifying an SNPN, the P-CSCF node may further include the received information (PLMN ID and NID) in the IMS signalling that the P-CSCF node proxies to the next hop or node. In some embodiments, other IMS nodes (other than P-CSCF) or all IMS nodes receiving such information (e.g., PLMN ID and NID uniquely identifying a particular SNPN) will proxy the information to the next IMS hop, where applicable. Of note, it is contemplated that, in some embodiments, one of more of the network nodes, e.g., the P-CSCF node and/or other network nodes, may do more than just proxy the received information. For example, some network nodes may generate and send information rather than just proxy the received information. As an example, some network nodes may send information to a charging node. In this example, the information sent is not proxied information.

In some embodiments, the subscription by the P-CSCF node may be applicable/used both for LBO, and deployments without IMS level roaming agreements. Other IMS nodes may also subscribe to this extended PLMN change event depending on the use case, for example, IMS application server (AS) originating calls on behalf of an IMS user/subscriber.

Using the arrangements disclosed herein, the PLMN ID+NID information may now be available to one or more or all IMS nodes and may advantageously allow to distinguish between SNPNs for one or more purposes (e.g., individual SNPN charging, statistics, etc.).

Before describing in detail exemplary embodiments, it is noted that the embodiments reside primarily in combinations of apparatus components and processing steps related to IMS support for SNPNs. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein.

As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The UE herein can be any type of wireless device capable of communicating with a network node or another UE over radio signals. In some embodiments, the UE may be an SNPN UE. The UE herein can by any type of communication device capable of communicating with another UE, an application server, a network node, a server, an IMS network function (NF) or other IMS network node, via a wired connection and/or a wireless connection. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "node" is used herein and can be any kind of network node, such as, a P-CSCF node, an S-CSCF node and/or an I-CSCF node. In some embodiments, the "node" can be any IMS node, etc. In some embodiments, the "node" can be another node, even a network node outside of IMS, that may, for example, be a network node (e.g., policy node, such as, policy control function (PCF) node and/or a policy and charging rules function (PCRF) node, etc.) supporting one or more of the arrangements disclosed herein. In some embodiments, the network node is a charging node or a statistical analysis node, etc.

In some embodiments, one or more of the nodes described herein may be more generally considered and/or comprise an application function (AF). For example, the P-CSCF, S-CSCF, I-CSCF and/or policy node described herein may be more generally considered and/or comprise an AF.

An AF may interact with the Third Generation Partnership Project (3GPP) core network to provide one or more of services. Based on operator deployment, an AF may be trusted by the operator to interact directly with relevant network functions (NFs). AFs not permitted by the operator to access directly the NFs may use, for example, an external exposure framework (e.g., via a network exposure function (NEF)) to interact with relevant NFs. In some embodiments, the AF may provide one or more services to a user/UE, in which, for example, a packet-based service data flow is provided to the user/UE, e.g., the streaming of video and/or audio data packets from a content provider to a subscriber of a mobile communications network. The AF may for example be attached to or part of the 3GPP Policy and Charging (PCC) architecture and may be specified in one or more particular 3GPP Technical Specifications.

A node may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node is said to be virtualized. A node may be associated with multiple physical components that may be located either in one location, or may be distributed across multiple locations.

Any two or more embodiments described in this disclosure may be combined in any way with each other.

Note also that some embodiments of the present disclosure may be supported by standard documents disclosed in Third Generation Partnership Project (3GPP) technical specifications. That is, some embodiments of the description can be supported by the above documents. In addition, all the terms disclosed in the present document may be described by the above standard documents.

Note that although terminology from one particular wireless system, such as, for example, $3^{rd}$ Generation Partnership Project (3GPP), Long Term Evolution (LTE), $5^{th}$ Generation (5G) (also known as New Radio (NR)), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a policy node or a P-CSCF node or any network node may be distributed over a plurality of policy nodes or a plurality of P-CSCF nodes or a plurality of network nodes. In other words, it is contemplated that the functions of the policy node, P-CSCF node or network node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
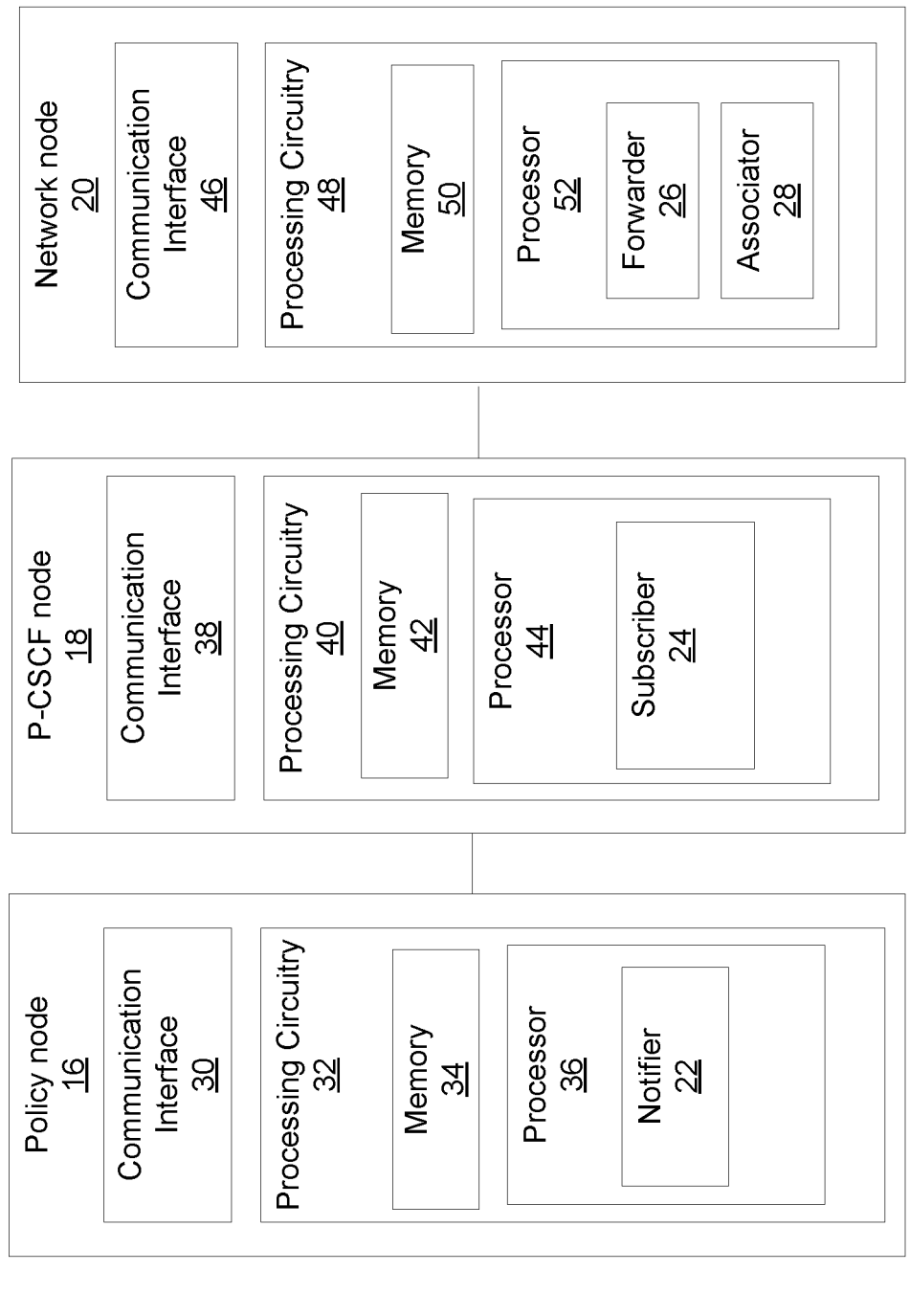
FIG. 2 illustrates an example system architecture and example hardware arrangements for devices in the system, according to some embodiments of the present disclosure.

Referring again to the drawing figures, in which like elements are referred to by like reference numerals, there is shown in FIG. 2 a schematic diagram of a communication system 14, according to another embodiment, constructed in accordance with the principles of the present disclosure. The communication system 14 in FIG. 2 is a non-limiting example and other embodiments of the present disclosure may be implemented by one or more other systems and/or networks. Referring to FIG. 2, the system 14 includes a policy node 16, a P-CSCF node 18, and a network node 20.

The policy node 16 may be, for example, a PCF node and/or a PCRF node. The P-CSCF node 18 may be a proxy for a UE to connect to IMS and/or communicate with another device via the IMS. The network node 20 can be any network node, such as e.g., an IMS node, such as, a serving-call session control function (S-CSCF) node, an interrogating-call session control function (I-CSCF) node, etc. or another network node, such as an application server (AS).

It should be noted that, for simplicity, a single node is shown for the various entities in the system 14 depicted in FIG. 2 (e.g., a single policy node 16, a single P-CSCF 18, a single network node 20); however, it should be understood that the system 14 may include numerous entities/nodes of those shown in FIG. 2, as well as, additional entities/nodes not shown in FIG. 2. In addition, the system 14 may include many more connections and/or interfaces than those shown in FIG. 2.

Example implementations, in accordance with an embodiment, of the policy node 16, P-CSCF node 18, and a network node 20 (e.g., S-CSCF node, IMS node, AS, etc.) discussed herein will now be described with reference to FIG. 2.

The policy node 16 includes notifier 22 configured to send a Public Land Mobile Network, PLMN, identifier, ID, and a network identifier, NID, a combination of the PLMN ID and the NID identifying a standalone non-public network, SNPN being associated with a user equipment, UE.

The P-CSCF node 18 includes subscriber 24 configured to receive an Internet Protocol, IP, Multimedia Subsystem, IMS, registration request from a user equipment, UE; and as a result of receiving the IMS registration request, subscribe to be notified of a Public Land Mobile Network, PLMN, identifier, ID, and a network identifier, NID, a combination of the PLMN ID and the NID identifying a standalone non-public network, SNPN, associated with the UE.

The network node 20 includes forwarder 26 receive a Public Land Mobile Network, PLMN, identifier, ID, and a network identifier, NID, a combination of the PLMN ID and the NID identifying a standalone non-public network, SNPN, associated with a user equipment, UE; and send the received PLMN ID and the NID to a second application function, AF, node.

The network node 20 further includes associator 28 configured to receive information associated to a Public Land Mobile Network (PLMN) identifier (ID) and network identifier (NID), a combination of the PLMN ID and the NID identifying a standalone non-public network (SNPN); associate the received information to the identified SNPN; and use the information to perform one of charging for the SNPN and statistical analysis on the SNPN.

The policy node 16 includes a communication interface 30, processing circuitry 32, and memory 34. In some embodiments, the communication interface 30 may be formed as or may include, for example, one or more radio frequency (RF) transmitters, one or more RF receivers, and/or one or more RF transceivers, and/or may be considered a radio interface. In some embodiments, the communication interface 30 may also include a wired interface.

The processing circuitry 32 may include one or more processors 36 and memory, such as, the memory 34. In particular, in addition to a traditional processor and memory, the processing circuitry 32 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 34, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the policy node 16 may further include software stored internally in, for example, memory 34, or stored in external memory (e.g., database) accessible by the policy node 16 via an external connection. The software may be executable by the processing circuitry 32. The processing circuitry 32 may be configured to control any of the methods and/or processes described herein and/or to cause such methods, and/or processes to be performed, e.g., by the policy node 16. The memory 34 is configured to store data, programmatic software code and/or other information described herein. In some embodiments, the software may include instructions stored in memory 34 that, when executed by the processor 36 and/or notifier 22 causes the processing circuitry 32 and/or configures the policy node 16 to perform the processes described herein with respect to the policy node 16 such the processes described with reference to FIG. 3 and the other figures.

The P-CSCF node 18 includes a communication interface 38, processing circuitry 40, and memory 42. The communication interface 38 may be configured to communicate with policy node 16 and/or other elements in the system 14 to facilitate IMS support for stand-alone NPN according to one or more of the techniques in the present disclosure. In some embodiments, the communication interface 38 may be formed as or may include, for example, one or more radio frequency (RF) transmitters, one or more RF receivers, and/or one or more RF transceivers, and/or may be considered a radio interface. In some embodiments, the communication interface 38 may also include a wired interface.

The processing circuitry 40 may include one or more processors 44 and memory, such as, the memory 42. In particular, in addition to a traditional processor and memory, the processing circuitry 40 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the P-CSCF node 18 may further include software stored internally in, for example, memory 42, or stored in external memory (e.g., database) accessible by the P-CSCF node 18 via an external connection. The software may be executable by the processing circuitry 40. The processing circuitry 40 may be configured to control any of the methods and/or processes described herein and/or to cause such methods, and/or processes to be performed, e.g., by the P-CSCF node 18. The memory 42 is configured to store data, programmatic software code and/or other information described herein. In some embodiments, the software may include instructions stored in memory 42 that, when executed by the processor 44 and/or subscriber 24, causes the processing circuitry 40 and/or configures the P-CSCF node 18 to perform the processes described herein with respect to the P-CSCF node 18 (e.g., processes described with reference to FIG. 4 and/or any of the other figures).

The network node 20 (e.g., S-CSCF node, AS, charging node, statistical analysis node, etc.) includes a communication interface 46, processing circuitry 48, and memory 50. The communication interface 46 may be configured to communicate with other elements in the system 14 to facilitate IMS support for stand-alone NPN according to one or more of the techniques in the present disclosure. In some embodiments, the communication interface 46 may be formed as or may include, for example, one or more radio frequency (RF) transmitters, one or more RF receivers, and/or one or more RF transceivers, and/or may be considered a radio interface. In some embodiments, the communication interface 46 may also include a wired interface.

The processing circuitry 48 may include one or more processors 52 and memory, such as, the memory 50. In particular, in addition to a traditional processor and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) the memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 20 may further include software stored internally in, for example, memory 50, or stored in external memory (e.g., database) accessible by the network node 20 via an external connection. The software may be executable by the processing circuitry 48. The processing circuitry 48 may be configured to control any of the methods and/or processes described herein and/or to cause such methods, and/or processes to be performed, e.g., by the network node 20. The memory 50 is configured to store data, programmatic software code and/or other information described herein. In some embodiments, the software may include instructions stored in memory 50 that, when executed by the processor 52 and/or forwarder 26 and/or associator 28, causes the processing circuitry 48 and/or configures the network node 20 to perform the processes described herein with respect to the network node 20 (e.g., S-CSCF node, AS, charging node, statistical analysis node, etc.) such as the processes described with respect to FIG. 5, and/or FIG. 6 and/or the other figures.

It is noted that, although the interconnection of the policy node 16, P-CSCF node 18 and network node 20 are shown in serial, such depiction is for the sake of simplicity and ease of explanation. It is understood that or more of the policy node 16, P-CSCF node 18 and network node 20 may communicate via a wired and/or wireless network, i.e., cloud network, and that the policy node 16, P-CSCF node 18 and network node 20 are not literally connected to one another. In other words, in FIG. 2, the connection between the policy node 16, P-CSCF node 18 and network node 20 is shown without explicit reference to any intermediary devices or connections. However, it should be understood that intermediary devices and/or connections may exist between these devices, although not explicitly shown.

Although FIG. 2 shows notifier 22, subscriber 24 and forwarder 26, associator 28 as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

In some embodiments, the inner workings of the nodes shown in FIG. 2 may be as shown in FIG. 2 and independently, the surrounding network topology may be that of FIG. 1.

FIG. 3 is a flowchart of an exemplary process in an AF node such as a policy node 16 for IMS support for SNPN according to the arrangements disclosed herein. One or more Blocks and/or functions and/or methods performed by the policy node 16 may be performed by one or more elements of policy node 16 such as by notifier 22 in processing circuitry 32, memory 34, processor 36, communication interface 30, etc. according to the example process/method. The method includes receiving (Block S100), such as via notifier 22, processing circuitry 32, memory 34, processor 36 and/or communication interface 30, from an Internet Protocol (IP) Multimedia Subsystem (IMS) node, a subscription request, the subscription request requesting to be notified of a Public Land Mobile Network (PLMN) identifier (ID) and network identifier (NID), a combination of the PLMN ID and the NID identifying a standalone non-public network (SNPN). The method includes, as a result of the subscription request, sending (Block S102), such as via notifier 22, processing circuitry 32, memory 34, processor 36 and/or communication interface 30, to the IMS node, a notification of the PLMN ID and the NID identifying the SNPN to which a user equipment (UE) is attached. In some embodiments, the IMS node requesting the notification is a proxy-call session control function (P-CSCF) node.

FIG. 4 is a flowchart of an exemplary process in an AF node such as a P-CSCF node 18 for IMS support for SNPN according to the arrangements disclosed herein. One or more Blocks and/or functions and/or methods performed by the P-CSCF node 18 may be performed by one or more elements of P-CSCF node 18 such as by subscriber 24 in processing circuitry 40, memory 42, processor 44, communication interface 38, etc. according to the example process/method. The method includes, as a result of an Internet Protocol (IP) Multimedia Subsystem (IMS) registration request from a user equipment (UE), subscribing (Block S110), such as via subscriber 24, processing circuitry 40, memory 42, processor 44 and/or communication interface 38, to be notified of a Public Land Mobile Network (PLMN) identifier (ID) and network identifier (NID), a combination of the PLMN ID and the NID identifying a standalone non-public network (SNPN).

In some embodiments, the method further includes, as a result of the subscription, receiving, such as via subscriber 24, processing circuitry 40, memory 42, processor 44 and/or communication interface 38, a notification including the PLMN ID and the NID identifying the SNPN to which the UE is attached. In some embodiments, the method includes forwarding, such as via subscriber 24, processing circuitry 40, memory 42, processor 44 and/or communication interface 38, the IMS registration request to an interrogating-call session control function (I-CSCF) node, the IMS registration request including the received PLMN ID and the NID. In some embodiments, the method includes sending the received PLMN ID and the NID to an IMS node.

Figure 5:
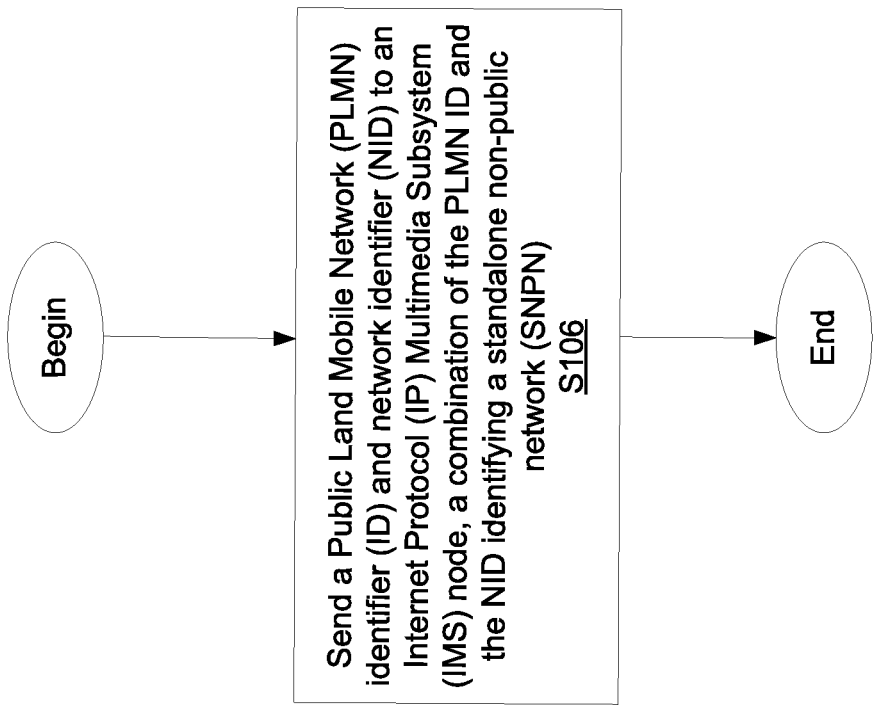
FIG. 5 is a flowchart of an exemplary process in a network node such as an AF node according to some embodiments of the present disclosure.

FIG. 5 is a flowchart of an exemplary process in an AF node such as a network node 20 for IMS support for SNPN according to the arrangements disclosed herein. One or more Blocks and/or functions and/or methods performed by the network node 20 may be performed by one or more elements of network node 20 such as forwarder 26 in processing circuitry 48, memory 50, processor 52, communication interface 46, etc. according to the example process/method. The method includes sending (Block S120), such as via forwarder 26, processing circuitry 48, memory 50, processor 52 and/or communication interface 46, a Public Land Mobile Network (PLMN) identifier (ID) and network identifier (NID) to an Internet Protocol (IP) Multimedia Subsystem (IMS) node, a combination of the PLMN ID and the NID identifying a standalone non-public network (SNPN).

In some embodiments, the method includes subscribing, such as via forwarder 26 in processing circuitry 48, memory 50, processor 52 and/or communication interface 46, to be notified of the PLMN ID and the NID; and as a result of the subscription, receiving, such as via forwarder 26 in processing circuitry 48, memory 50, processor 52, communication interface 46, a notification from a policy node 16 including the PLMN ID and the NID identifying the SNPN to which a user equipment (UE) is attached. In some embodiments, the network node 20 is a serving-call session control function (S-CSCF) node. In other embodiments, the network node 20 is another IMS node. In some embodiments, sending the PLMN ID and the NID further includes, as a result of receiving the PLMN ID and NID, forwarding, such as via forwarder 26, processing circuitry 48, memory 50, processor 52 and/or communication interface 46, in IMS signaling to a next hop the received PLMN ID and NID.

Figure 6:
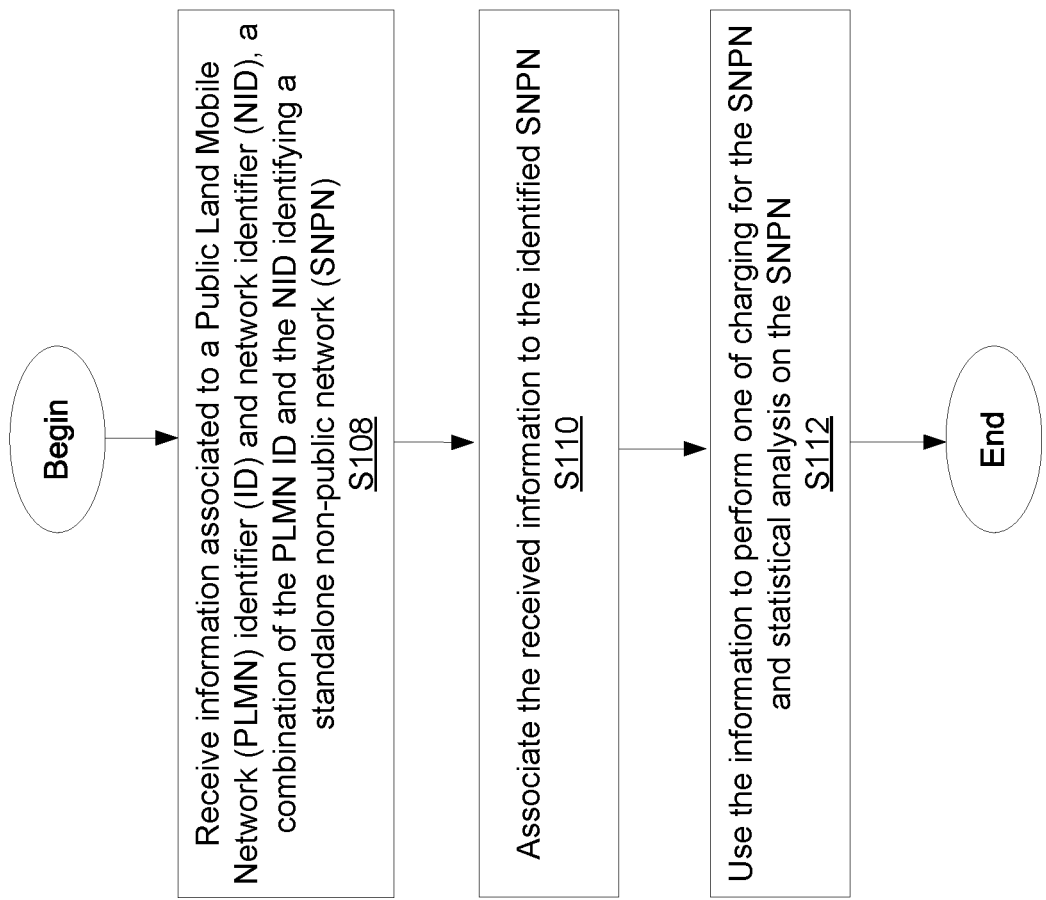
FIG. 6 is a flowchart of another exemplary process in a network node such as an AF node according to some embodiments of the present disclosure.

FIG. 6 is a flowchart of an exemplary process in a network node 20 such as an AF node for IMS support for SNPN according to the arrangements disclosed herein. One or more Blocks and/or functions and/or methods performed by the network node 20 may be performed by one or more elements of network node 20, such as via associator 28 in processing circuitry 48, memory 50, processor 52, communication interface 46, etc. according to the example process/method. The method includes receiving (Block S130) information associated to a Public Land Mobile Network (PLMN) identifier (ID) and network identifier (NID), a combination of the PLMN ID and the NID identifying a standalone non-public network (SNPN). The method includes associating (Block S132), such as via associator 28 in processing circuitry 48, memory 50, processor 52, communication interface 46, the received information to the identified SNPN. The method includes using (Block S134), such as via associator 28 in processing circuitry 48, memory 50, processor 52, communication interface 46, the information to perform one of charging for the SNPN and statistical analysis on the SNPN. In some embodiments, the network node 20 may be a charging node that performs charging per SNPN that is identified by the PLMN ID and NID combination. In some embodiments, the network node 20 may be another node, such as, an application server or other node that performs statistical analysis, in which information collected is to be separated on a per SNPN basis.

Figure 7:
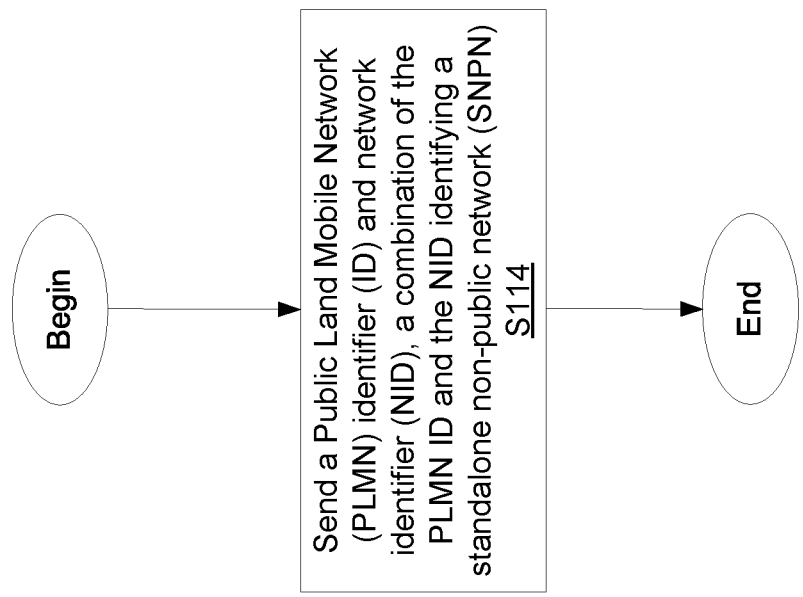
FIG. 7 is a flowchart of an example process in a policy node according to some embodiments of the present disclosure.

FIG. 7 is a flowchart of an example process in an AF node such as a policy node 16 for IMS support for SNPN according to the arrangements disclosed herein. One or more Blocks and/or functions and/or methods performed by the policy node 16 may be performed by one or more elements of policy node 16 such as by notifier 22 in processing circuitry 32, memory 34, processor 36, communication interface 30, etc. according to the example process/method. The method includes sending (Block S114), such as via notifier 22, processing circuitry 32, memory 34, processor 36 and/or communication interface 30, sending a Public Land Mobile Network, PLMN, identifier, ID, and a network identifier, NID, a combination of the PLMN ID and the NID identifying a standalone non-public network, SNPN being associated with a user equipment, UE.

In some embodiments, the method further includes receiving, such as via notifier 22, processing circuitry 32, memory 34, processor 36 and/or communication interface 30, a subscription request, the subscription request requesting to be notified of the PLMN ID and the NID; and sending the PLMN ID and the NID further comprises sending, such as via notifier 22, processing circuitry 32, memory 34, processor 36 and/or communication interface 30, a notification comprising the PLMN ID and the NID as a result of the received subscription request. In some embodiments, at least one of: sending the PLMN ID and the NID comprises sending, such as via notifier 22, processing circuitry 32, memory 34, processor 36 and/or communication interface 30, the PLMN ID and the NID to an application function (AF) node; receiving the subscription request comprises receiving, such as via notifier 22, processing circuitry 32, memory 34, processor 36 and/or communication interface 30, the subscription request from the AF node; and the AF node is at least one of an Internet Protocol, IP, Multimedia Subsystem, IMS, node and a proxy-call session control function, P-CSCF, node.

In some embodiments, sending the PLMN ID and the NID and/or receiving the subscription request corresponds to a PLMN change event to report the combination of the PLMN ID and the NID identifying the SNPN associated with the UE. In some embodiments, the combination of the PLMN ID and the NID is used for at least one of charging and statistical data collection for the UE. In some embodiments, sending the PLMN ID and the NID further comprises sending, such as via notifier 22, processing circuitry 32, memory 34, processor 36 and/or communication interface 30, a notification comprising the PLMN ID and the NID as a result of a handover of the UE from a first PLMN to a second PLMN. In some embodiments, the PLMN ID comprised in the notification identifies the second PLMN; and the NID comprised in the notification identifies the SNPN out of a plurality of SNPNs associated with the second PLMN.

Figure 8:
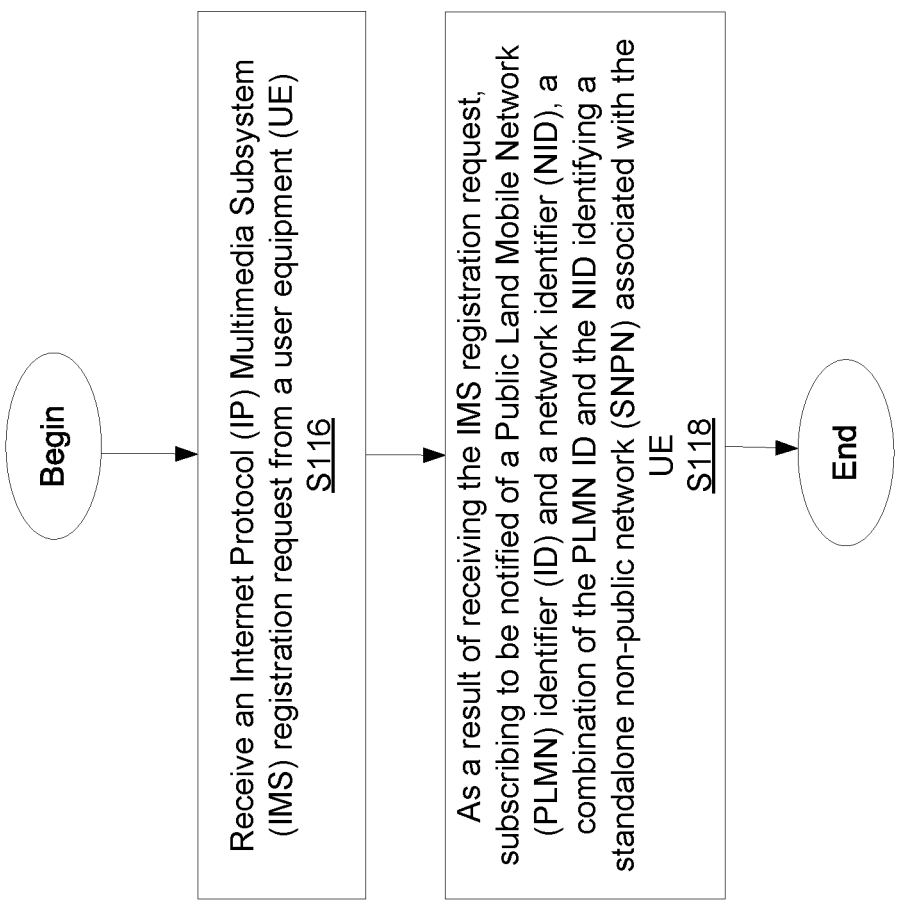
FIG. 8 is a flowchart of an example process in an AF node such as a P-CSCF node according to some embodiments of the present disclosure.

FIG. 8 is a flowchart of an exemplary process in an AF node such as a P-CSCF node 18 for IMS support for SNPN according to the arrangements disclosed herein. One or more Blocks and/or functions and/or methods performed by the P-CSCF node 18 may be performed by one or more elements of P-CSCF node 18 such as by subscriber 24 in processing circuitry 40, memory 42, processor 44, communication interface 38, etc. according to the example process/method. The method includes receiving (Block S116), such as via subscriber 24, processing circuitry 40, memory 42, processor 44 and/or communication interface 38, an Internet Protocol, IP, Multimedia Subsystem, IMS, registration request from a user equipment, UE. The method includes as a result of receiving the IMS registration request, subscribing (Block S118), such as via subscriber 24, processing circuitry 40, memory 42, processor 44 and/or communication interface 38, to be notified of a Public Land Mobile Network, PLMN, identifier, ID, and a network identifier, NID, a combination of the PLMN ID and the NID identifying a standalone non-public network, SNPN, associated with the UE.

In some embodiments, the method further includes at least one of: as a result of the subscription, receiving, such as via subscriber 24, processing circuitry 40, memory 42, processor 44 and/or communication interface 38, a notification including the PLMN ID and the NID identifying the SNPN associated with the UE; and sending, such as via subscriber 24, processing circuitry 40, memory 42, processor 44 and/or communication interface 38, the received PLMN ID and the NID to a second AF node. In some embodiments, the method further comprises including, such as via subscriber 24, processing circuitry 40, memory 42, processor 44 and/or communication interface 38, the received PLMN ID and the NID in a SIP message.

In some embodiments, the SIP message is a SIP register request message. In some embodiments, the method further includes forwarding, such as via subscriber 24, processing circuitry 40, memory 42, processor 44 and/or communication interface 38, the SIP message comprising the PLMN ID and the NID to a second AF node. In some embodiments, the AF node comprises at least one of an IMS node and a proxy-call session control function, P-CSCF, node.

Figure 9:
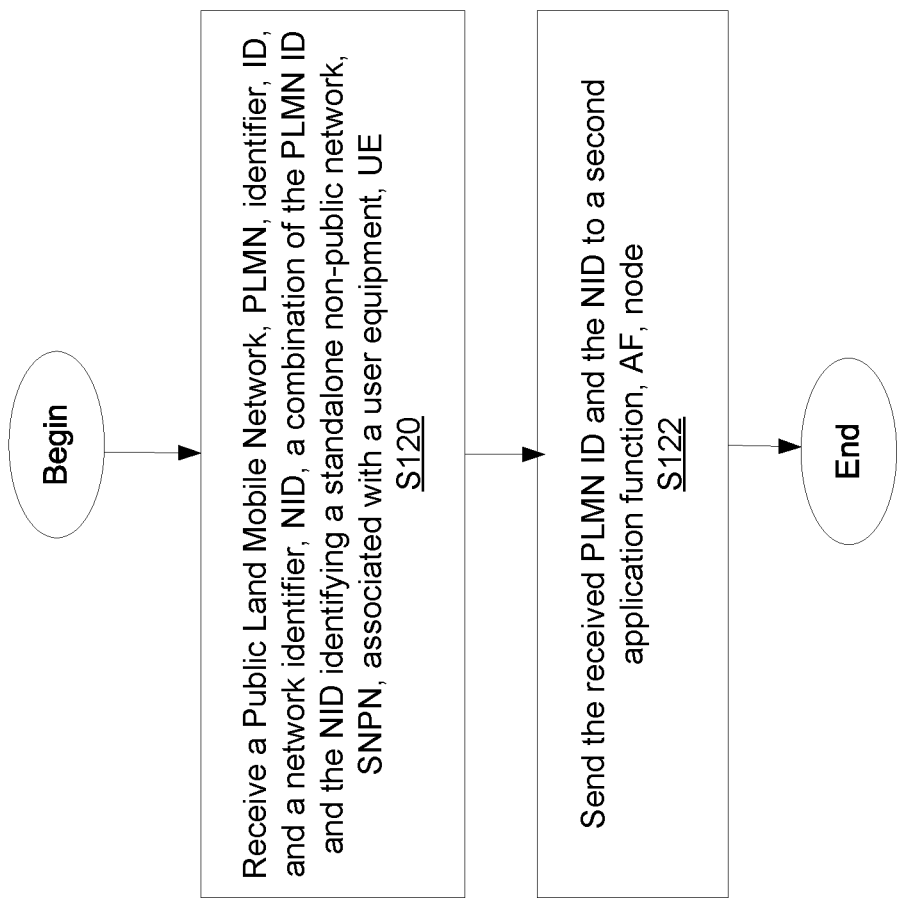
FIG. 9 is a flowchart of an example process in an AF node such as a S-CSCF node or any other IMS node according to some embodiments of the present disclosure.

FIG. 9 is a flowchart of an exemplary process in an AF node such as a network node 20 for IMS support for SNPN according to the arrangements disclosed herein. One or more Blocks and/or functions and/or methods performed by the network node 20 may be performed by one or more elements of network node 20 such as forwarder 26 in processing circuitry 48, memory 50, processor 52, communication interface 46, etc. according to the example process/method. The method includes receiving (Block S120), such as forwarder 26, processing circuitry 48, memory 50, processor 52 and/or communication interface 46, a Public Land Mobile Network, PLMN, identifier, ID, and a network identifier, NID, a combination of the PLMN ID and the NID identifying a standalone non-public network, SNPN, associated with a user equipment, UE. The method includes sending (Block S122), such as forwarder 26, processing circuitry 48, memory 50, processor 52 and/or communication interface 46, a Public Land Mobile Network, PLMN, identifier, ID, and a network identifier, NID, the received PLMN ID and the NID to a second application function, AF, node.

In some embodiments, the method further includes subscribing, such as forwarder 26, processing circuitry 48, memory 50, processor 52 and/or communication interface 46, a Public Land Mobile Network, PLMN, identifier, ID, and a network identifier, NID, to be notified of the PLMN ID and the NID associated with the UE; and receiving the PLMN ID and the NID further comprising receiving, such as forwarder 26, processing circuitry 48, memory 50, processor 52 and/or communication interface 46, a Public Land Mobile Network, PLMN, identifier, ID, and a network identifier, NID, the PLMN ID and the NID identifying the SNPN associated with the UE as a result of the subscription. In some embodiments, the AF node comprises at least one of an IMS node, an IMS application server, AS, and a serving-call session control function, S-CSCF, node.

Figure 10:
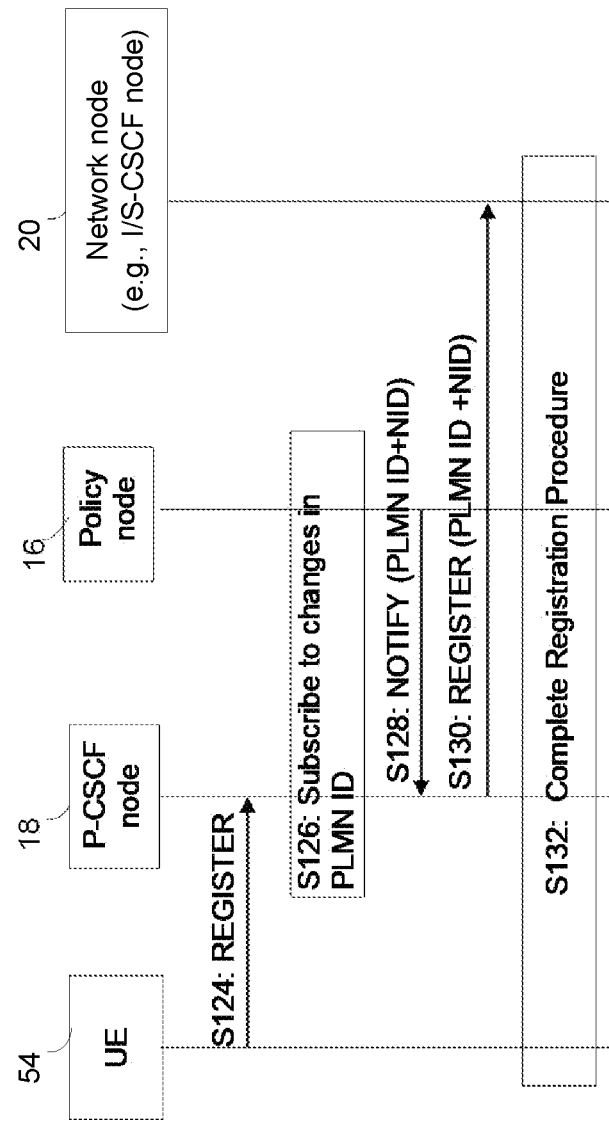
FIG. 10 is a call flow diagram that illustrates an example of IMS support for SNPNs according to some embodiments of the present disclosure.

Having generally described arrangements for IMS support for SNPNs, a more detailed description of some of the embodiments are provided as follows with reference to the call flow diagram in FIG. 10, and which may be implemented by one or more of a UE 54, policy node 16, P-CSCF node 18 and/or network node 20 (e.g., IMS node, S-CSCF node, AS, charging node, statistical analysis node, etc.).

This procedure applies to LBO and deployments without IMS level roaming agreements. In addition, any IMS node requiring this information can also execute steps 2-4 in the procedure below when needed.

Initial IMS Registration Procedure

In some embodiments, IMS support for SNPNs may include one or more of the following steps: S124. A UE sends a session initiation protocol (SIP) REGISTER request (also referred to herein as "IMS registration request") to the P-CSCF node 18.

S126. If this is an initial IMS registration, then the P-CSCF node 18 subscribes to the policy node 16 (e.g., PCF/PCRF) to be notified of the PLMN ID and NID where the UE is currently attached.

S128. As a result of the subscription, the policy node 16 may forward the PLMN ID and NID to the P-CSCF node 18. The P-CSCF node 18 stores the PLMN ID and NID.

S130. The P-CSCF node 18 includes the received PLMN ID and NID in the SIP REGISTER request before forwarding the request to another network node 20 (e.g., I-CSCF).

S132. Normal IMS registration procedure may then be completed.

In yet other embodiments (e.g., other than an initial IMS registration procedure), the PLMN ID and NID information may be subscribed to by yet other IMS nodes (e.g., other than P-CSCF) and/or such IMS nodes may forward/include the received PLMN ID and NID information to another IMS node in a next IMS hop so that e.g., such information can be available to IMS for e.g., individual SNPN charging, statistics, etc.

Potential Impacts on Existing Entities and Interfaces in Some Embodiments

P-CSCF:

In some embodiments, the P-CSCF node 18 subscribes e.g., at initial IMS registration, to the PLMN ID and NID event to receive the PLMN ID and NID that the UE is currently attached to.

In some embodiments, the P-CSCF node 18 proxies (and/or forwards and/or sends) the received information to subsequent IMS nodes, and/or other nodes that may use this information.

S-CSCF, Other IMS Nodes:

In some embodiments, a network node 20 (e.g., S-CSCF, other IMS node, etc.) conveys/sends/forwards received PLMN ID and NID information in IMS signalling that such network node 20 proxies and/or sends to another network node 20.

In some embodiments, the network node 20 receives the information from another network node 20. In some embodiments, the network node 20 may initiate a subscription to e.g., the policy node 16 or other node, to the PLMN event (e.g., PLMN ID and NID) and may therefore receive the information in a notification as a result of the subscription.

PCRF/PCF:

In some embodiments, the policy node 16 (e.g., PCRF/PCF) may support extending the current PLMN change event to report the PLMN ID and NID information to e.g., nodes that subscribe to the event.

In some embodiments, any IMS node can subscribe to receive the information (e.g., PLMN ID and NID).

In some embodiments, one or more network nodes 20, such as an AF node may collect information associated to individual SNPNs. For example, a charging node may collect usage and other charging information that is to be separated on a per SNPN basis. In some embodiments, a network node may collect statistical information to be separated on a per SNPN basis.

Some embodiments may include one or more of the following:

Embodiment A1. A method implemented in a policy node, the method comprising:

receiving, from an Internet Protocol (IP) Multimedia Subsystem (IMS) node, a subscription request, the subscription request requesting to be notified of a Public Land Mobile Network (PLMN) identifier (ID) and network identifier (NID), a combination of the PLMN ID and the NID identifying a standalone non-public network (SNPN); and as a result of the subscription request, sending, to the IMS node, a notification of the PLMN ID and the NID identifying the SNPN to which a user equipment (UE) is attached.

Embodiment A2. The method of Embodiment A1, wherein the IMS node requesting the notification is a proxy-call session control function (P-CSCF) node.

Embodiment B1. A method implemented in a proxy-call session control function (P-CSCF) node, the method comprising:

as a result of an Internet Protocol (IP) Multimedia Subsystem (IMS) registration request from a user equipment (UE), subscribing to be notified of a Public Land Mobile Network (PLMN) identifier (ID) and network identifier (NID), a combination of the PLMN ID and the NID identifying a standalone non-public network (SNPN).

Embodiment B2. The method of Embodiment B1, further comprising at least one:

as a result of the subscription, receiving a notification including the PLMN ID and the NID identifying the SNPN to which the UE is attached;

forwarding the IMS registration request to an interrogating-call session control function (I-CSCF) node, the IMS registration request including the received PLMN ID and the NID; and/or sending the received PLMN ID and the NID to an IMS node.

Embodiment C1. A method implemented in a network node, the method comprising:

sending a Public Land Mobile Network (PLMN) identifier (ID) and network identifier (NID) to an Internet Protocol (IP) Multimedia Subsystem (IMS) node, a combination of the PLMN ID and the NID identifying a standalone non-public network (SNPN).

Embodiment C2. The method of Embodiment C1, further comprising:

subscribing to be notified of the PLMN ID and the NID; and as a result of the subscription, receiving a notification from a policy node including the PLMN ID and the NID identifying the SNPN to which a user equipment (UE) is attached.

Embodiment C3. The method of any one of Embodiments C1 and C2, wherein sending the PLMN ID and NID further comprises:

as a result of receiving the PLMN ID and NID, forwarding in IMS signaling to a next hop the received PLMN ID and NID.

Embodiment D1. A policy node comprising processing circuitry, the processing circuitry configured to cause the policy node to:

receive, from an Internet Protocol (IP) Multimedia Subsystem (IMS) node, a subscription request, the subscription request requesting to be notified of a Public Land Mobile Network (PLMN) identifier (ID) and network identifier (NID), a combination of the PLMN ID and the NID identifying a standalone non-public network (SNPN); and as a result of the subscription request, send, to the IMS node, a notification of the PLMN ID and the NID identifying the SNPN to which a user equipment (UE) is attached.

Embodiment D2. The policy node of Embodiment D1, wherein the IMS node requesting the notification is a proxy-call session control function (P-CSCF) node.

Embodiment E1. A proxy-call session control function (P-CSCF) node comprising processing circuitry, the processing circuitry configured to cause the P-CSCF node to:

as a result of an Internet Protocol (IP) Multimedia Subsystem (IMS) registration request from a user equipment (UE), subscribe to be notified of a Public Land Mobile Network (PLMN) identifier (ID) and network identifier (NID), a combination of the PLMN ID and the NID identifying a standalone non-public network (SNPN).

Embodiment E2. The P-CSCF node of Embodiment E1, wherein the processing circuitry is further configured to cause the P-CSCF node to at least one:

as a result of the subscription, receive a notification including the PLMN ID and the NID identifying the SNPN to which the UE is attached;

forward the IMS registration request to an interrogating-call session control function (I-CSCF) node, the IMS registration request including the received PLMN ID and the NID; and/or send the received PLMN ID and the NID to an IMS node.

Embodiment F1. A network node comprising processing circuitry, the processing circuitry configured to cause the network node to:

send a Public Land Mobile Network (PLMN) identifier (ID) and network identifier (NID) to an Internet Protocol (IP) Multimedia Subsystem (IMS) node, a combination of the PLMN ID and the NID identifying a standalone non-public network (SNPN).

Embodiment F2. The network node of Embodiment F1, wherein the processing circuitry is further configured to cause the network node to at least one:

subscribe to be notified of the PLMN ID and the NID; and as a result of the subscription, receive a notification from a policy node including the PLMN ID and the NID identifying the SNPN to which a user equipment (UE) is attached.

Embodiment F3. The network node of any one of Embodiments F1 and F2, wherein the processing circuitry is configured to cause the network node to send the PLMN ID and NID by being configured to cause the network node to:

as a result of receiving the PLMN ID and NID, forward in IMS signaling to a next hop the received PLMN ID and NID.

Embodiment G1. A method implemented in a network node, the method comprising:

receiving information associated to a Public Land Mobile Network (PLMN) identifier (ID) and network identifier (NID), a combination of the PLMN ID and the NID identifying a standalone non-public network (SNPN);

associating the received information to the identified SNPN; and using the information to perform one of charging for the SNPN and statistical analysis on the SNPN.

Embodiment H1. A network node comprising processing circuitry, the processing circuitry configured to cause the network node to:

receive information associated to a Public Land Mobile Network (PLMN) identifier (ID) and network identifier (NID), a combination of the PLMN ID and the NID identifying a standalone non-public network (SNPN);

associate the received information to the identified SNPN; and use the information to perform one of charging for the SNPN and statistical analysis on the SNPN.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a policy node, the method comprising:
   receiving a subscription request from a proxy-call session control function, P-CSCF, node, the subscription request requesting to be notified of a Public Land Mobile Network identifier, PLMN ID, and a network identifier, NID; and
   sending, to the P-CSCF node, a notification comprising the PLMN ID and the NID, a combination of the PLMN ID and the NID identifying a standalone non-public network, SNPN, being associated with a user equipment, UE, the sending of the notification being a result of the received subscription request.

2. The method of claim 1, wherein:
   at least one of:
      sending the PLMN ID and the NID; and
      receiving the subscription request,
   corresponds to a PLMN change event to report the combination of the PLMN ID and the NID identifying the SNPN associated with the UE.

3. The method of claim 1, wherein the combination of the PLMN ID and the NID is used for at least one of charging and statistical data collection for the UE.

4. The method of claim 1, wherein sending the notification is further a result of a handover of the UE from a first PLMN to a second PLMN.

5. The method of claim 4, wherein:
   the PLMN ID comprised in the notification identifies the second PLMN; and
   the NID comprised in the notification identifies the SNPN out of a plurality of SNPNs associated with the second PLMN.

6. A method implemented in a proxy-call session control function, P-CSCF, node, the method comprising:
   receiving an Internet Protocol, IP, Multimedia Subsystem, IMS, registration request from a user equipment, UE;
   as a result of receiving the IMS registration request, transmitting a subscription request requesting to be notified of a Public Land Mobile Network identifier, PLMN ID, and a network identifier, NID, a combination of the PLMN ID and the NID identifying a standalone non-public network, SNPN, associated with the UE;

as a result of the transmitted subscription request, receiving a notification including the PLMN ID and the NID identifying the SNPN associated with the UE; and sending the received PLMN ID and the NID to another network node.

7. The method of claim 6, further comprising:

including the received PLMN ID and the NID in a Session Initiation Protocol, SIP, message.

8. The method of claim 7, wherein the SIP message is a SIP register request message.

9. The method of claim 7, further comprising:

forwarding the SIP message comprising the PLMN ID and the NID to the other network node.

10. A policy node comprising at least one processor and computer program instructions executable by the at least processor to cause the policy node to:

receive a subscription request from a proxy-call session control function, P-CSCF, node, the subscription request requesting to be notified of a Public Land Mobile Network identifier, PLMN ID, and a network identifier, NID; and send, to the P-CSCF node, a notification comprising the PLMN ID and the NID, a combination of the PLMN ID and the NID identifying a standalone non-public network, SNPN being associated with a user equipment, UE, the sending of the notification being a result of the received subscription request.

11. A network node comprising a proxy-call session control function, P-CSCF, at least one processor and computer program instructions executable by the processor to cause the network node to:

receive an Internet Protocol, IP, Multimedia Subsystem, IMS, registration request from a user equipment, UE;

as a result of receiving the IMS registration request, transmit a subscription request requesting to be notified of a Public Land Mobile Network identifier, PLMN ID, and a network identifier, NID, a combination of the PLMN ID and the NID identifying a standalone non-public network, SNPN, associated with the UE;

as a result of the transmitted subscription request, receive a notification including the PLMN ID and the NID identifying the SNPN associated with the UE; and send the received PLMN ID and the NID to another network node.

* * * * *